(12) United States Patent
Sakai et al.

(10) Patent No.: US 9,791,472 B2
(45) Date of Patent: Oct. 17, 2017

(54) ACCELERATION SENSOR

(71) Applicant: DENSO CORPORATION, Kariya, Aichi-pref. (JP)

(72) Inventors: Minekazu Sakai, Kariya (JP); Kiyomasa Sugimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 14/911,288

(22) PCT Filed: Sep. 1, 2014

(86) PCT No.: PCT/JP2014/004460
§ 371 (c)(1),
(2) Date: Feb. 10, 2016

(87) PCT Pub. No.: WO2015/033543
PCT Pub. Date: Mar. 12, 2015

(65) Prior Publication Data
US 2016/0187371 A1  Jun. 30, 2016

(30) Foreign Application Priority Data
Sep. 3, 2013 (JP) .................................. 2013-182292

(51) Int. Cl.
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/082* (2013.01)

(58) Field of Classification Search
CPC ... G01P 15/125; G01P 15/18; G01P 2015/082
See application file for complete search history.

(56) References Cited

U.S. PATENT DOCUMENTS 5,233,213 A * 8/1993 Marek ................. G01P 15/0802
257/415
5,383,364 A * 1/1995 Takahashi ............... G01P 15/18
361/280

(Continued)

FOREIGN PATENT DOCUMENTS

JP  2007-139505 A  6/2007
JP  2007-218608 A  8/2007

(Continued)

OTHER PUBLICATIONS

International Search Report and Written Opinion of the International Searching Authority dated Nov. 18, 2014 issued in the corresponding International application No. PCT/JP2014/004460 (and English translation).

*Primary Examiner* — David Bolduc
(74) *Attorney, Agent, or Firm* — Posz Law Group, PLC

(57) ABSTRACT

In an acceleration sensor, a semiconductor layer is provided with a rod-shaped weight portion that passes through a center of a frame portion, extends in a second direction, and is connected to the frame portion through a first beam portion. A first-direction movable electrode and a second-direction movable electrode are provided on the weight portion. According to the above configuration, because a mass of the first- and second-direction movable electrodes can be applied to the vicinity of a center of the frame portion, and a rotational moment can be reduced. Thus, detection accuracy can be restrained from being reduced.

8 Claims, 14 Drawing Sheets

(56) References Cited

U.S. PATENT DOCUMENTS

| | | | |
|---|---|---|---|
| 5,734,105 A | 3/1998 | Mizukoshi | |
| 6,128,953 A | 10/2000 | Mizukoshi | |
| 6,223,598 B1 | 5/2001 | Judy | |
| 6,388,300 B1* | 5/2002 | Kano | B81B 3/0086 257/417 |
| 6,470,747 B1 | 10/2002 | Mizukoshi | |
| 2002/0033047 A1* | 3/2002 | Oguchi | G01P 1/023 73/514.16 |
| 2002/0059829 A1 | 5/2002 | Sakai | |
| 2002/0104377 A1* | 8/2002 | Ishio | B81B 3/0008 73/504.14 |
| 2004/0017209 A1* | 1/2004 | Goto | G01P 15/0802 324/661 |
| 2004/0187573 A1 | 9/2004 | Sakai et al. | |
| 2005/0126287 A1* | 6/2005 | Malametz | G01P 15/08 73/504.12 |
| 2006/0032310 A1* | 2/2006 | Merassi | B81B 7/0048 73/514.35 |
| 2006/0185433 A1* | 8/2006 | Leonardson | G01P 15/125 73/514.32 |
| 2006/0205106 A1 | 9/2006 | Fukuda et al. | |
| 2007/0119252 A1* | 5/2007 | Adams | G01P 15/0802 73/510 |
| 2009/0049911 A1 | 2/2009 | Fukuda et al. | |
| 2009/0064785 A1 | 3/2009 | Fukuda et al. | |
| 2009/0320596 A1* | 12/2009 | Classen | G01P 15/125 73/514.32 |
| 2010/0018635 A1 | 1/2010 | Kouma et al. | |
| 2010/0307246 A1* | 12/2010 | Fujii | B81C 1/00182 73/514.16 |
| 2011/0120221 A1 | 5/2011 | Yoda | |
| 2011/0174074 A1* | 7/2011 | Li | G01C 19/5755 73/504.14 |
| 2011/0290023 A1* | 12/2011 | Takagi | G01C 19/5783 73/514.32 |
| 2011/0303010 A1* | 12/2011 | Yang | G01P 15/125 73/514.32 |
| 2012/0240679 A1 | 9/2012 | Netzer et al. | |
| 2012/0297873 A1* | 11/2012 | Zou | G01P 15/125 73/504.12 |
| 2013/0139595 A1* | 6/2013 | Tsai | G01P 15/125 73/514.32 |
| 2016/0187372 A1* | 6/2016 | He | G01P 15/125 73/514.32 |

FOREIGN PATENT DOCUMENTS

| | | |
|---|---|---|
| JP | 2010-181240 A | 8/2010 |
| JP | 2012-163507 A | 8/2012 |

* cited by examiner

ACCELERATION SENSOR

CROSS REFERENCE TO RELATED APPLICATIONS

This application is the U.S. national phase of International Patent Application No. PCT/JP2014/004460 filed on Sep. 1, 2014 and is based on Japanese Patent Application No. 2013-182292 filed on Sep. 3, 2013, the disclosures of which are incorporated herein by reference.

TECHNICAL FIELD

The present disclosure relates to an acceleration sensor that detects accelerations in two orthogonal directions.

BACKGROUND ART

For example, Patent Literature 1 has proposed an acceleration sensor configured by using a semiconductor substrate in which a semiconductor layer is stacked on a support substrate. In other words, in the acceleration sensor, the semiconductor layer is formed with a movable portion having a movable electrode provided on a frame portion that is displaced according to an acceleration in a predetermined direction included in a plane of the semiconductor layer, and a fixing portion having a fixed electrode facing the movable electrode.

In the acceleration sensor, because an interval between the movable electrode and the fixed electrode is changed according to the acceleration with the application of the acceleration in the predetermined direction, the acceleration is detected on the basis of a capacity between the movable electrode and the fixed electrode.

PRIOR ART LITERATURE

Patent Literature

Patent Literature 1: JP2007-139505A

SUMMARY OF INVENTION

Incidentally, in recent years, in such an acceleration sensor, there is a demand for detecting an acceleration in a direction that is orthogonal to the predetermined direction and parallel to the plane of the semiconductor layer, also. For that reason, the present inventors have studied an acceleration sensor illustrated in FIG. 14.

In other words, the acceleration sensor has a semiconductor substrate in which a semiconductor layer J1 is stacked on a support substrate. A movable portion J3 and first to fourth fixing portions J4 to J7 are formed by defining a groove portion J2 in the semiconductor layer J1.

Specifically, a frame portion J8 providing the movable portion J3 is shaped into a rectangular frame, and has a pair of first side portions J8a extending in an x-axis direction, and a pair of second side portions J8b extending in a y-axis direction. In FIG. 14, the x-axis direction corresponds to a horizontal direction of a paper surface of FIG. 14, the y-axis direction corresponds to a direction orthogonal to the x-axis direction on a plane of the semiconductor layer J1, and a z-axis direction corresponds to a direction orthogonal to the x-axis direction and the y-axis direction.

Each of the first side portions J8a in the frame portion J8 is provided with a first beam portion J9a that displaces the frame portion J8 in the y-axis direction when an acceleration including a component in the y-axis direction is applied to the first beam portion J9a. Likewise, each of the second side portions J8b in the frame portion J8 is provided with a second beam portion J9b that displaces the frame portion J8 in the x-axis direction when an acceleration including a component in the x-axis direction is applied to the second beam portion J9b. The frame portion J8 is supported by the support substrate in such a manner that first connection portions J10a extending from the respective first beam portions J9a to a center of the frame portion J8 and second connection portions J10b extending from the respective second beam portions J9b to a center of the frame portion J8 are connected to an anchor portion J11 supported by the support substrate. In other words, the frame portion J8 is in a state of being released from the support substrate.

The respective first and second side portions J8a and J8b in the frame portion J8 are provided with first to fourth movable electrode portions J12b to J15b through the first to fourth support portions J12a to J15d, respectively. In detail, the first and second movable electrode portions J12b and J13b are provided in the first and second support portions J12a and J13a in parallel to the y-axis direction. The third and fourth movable electrode portions J14b and J15b are provided in the third and fourth support portions J14a and J15a in parallel to the x-axis direction.

The first to fourth fixing portions J4 to J7 are formed so that first to fourth fixed electrode portions J4a to J7a face the first to fourth movable electrode portions J12b to J15b.

In such an acceleration sensor, when the acceleration including the component in the x-axis direction is applied to the acceleration sensor, the frame portion J8 is displaced in the x-axis direction by the second beam portion J9b, and the first connection portion J10a is flexed. Intervals between the first and second movable electrode portions J12b, J13b and the first and second fixed electrode portions J4a, J5a are changed according to the acceleration. For that reason, the acceleration in the x-axis direction is detected on the basis of respective capacities between the first and second movable electrode portions J12b, J13b, and the first and second fixed electrode portions J4a, J5a.

Likewise, when the acceleration including the component in the y-axis direction is applied to the acceleration sensor, the frame portion J8 is displaced in the y-axis direction by the first beam portion J9a, and the second connection portion J10b is flexed. Intervals between the third and fourth movable electrode portions J14b, J15b and the third and fourth fixed electrode portions J6a, J7a are changed according to the acceleration. For that reason, the acceleration in the y-axis direction is detected on the basis of respective capacities between the third and fourth movable electrode portions J14b, J15b, and the third and fourth fixed electrode portions J6a, J7a.

However, in the acceleration sensor of this type, the first to fourth movable electrode portions J12b to J15b (first to fourth support portions J12a to J15s) are provided on the first and second side portions J8a and J8b in the frame portion J8, respectively. For that reason, as illustrated in FIG. 15, a mass m of the first to fourth movable electrode portions J12b to J15b (first to fourth support portions J12a to J15a) is applied to the frame portion J8. The movable portion J3 having the frame portion J8 as described above is supported by the support substrate in a rotatable state with an axis passing through a center of the frame portion J8 and extending in the z-axis direction as an axis of rotation. Therefore, in the acceleration sensor, a distance between the axis of rotation and the first to fourth movable electrode portions J12b to J15b (first to fourth support portions J12a to J15a) becomes longer, and a rotational moment becomes larger. In other words, a rotation resonance becomes smaller. Therefore, detection accuracy is likely to be reduced due to the rotation of the frame portion.

In view of the above, it an object of the present disclosure to provide an acceleration sensor capable of suppressing a reduction in detection accuracy.

According to a first aspect of the present disclosure, an acceleration sensor includes: a semiconductor substrate having a support substrate and a semiconductor layer stacked on the support substrate; a first-direction movable electrode that is disposed in the semiconductor layer, and extends in a direction parallel to a second direction, in which a direction included in a plane of the semiconductor layer is referred to as a first direction, and the second direction is included in the plane of the semiconductor layer and is orthogonal to the first direction; a second-direction movable electrode that is disposed in the semiconductor layer, and extends in a direction parallel to the first direction; a frame portion that is disposed in the semiconductor layer; a first beam portion that is disposed in the semiconductor layer and provided on the frame portion, and displaced in the second direction when receiving an acceleration including a component in the second direction; a second beam portion that is disposed in the semiconductor layer and provided on the frame portion, and displaced in the first direction when receiving an acceleration including a component in the first direction; an anchor portion that supports the frame portion through the second beam portion; a first-direction fixed electrode that is disposed in the semiconductor layer, and arranged to face the first-direction movable electrode; and a second-direction fixed electrode that is disposed in the semiconductor layer, and arranged to face the second-direction movable electrode.

In addition, the semiconductor layer is provided with a rod-shaped weight portion that passes through a center of the frame portion, extends in the second direction, and is connected to the frame portion through the first beam portion. The first-direction movable electrode and the second-direction movable electrode are provided on the weight portion.

According to the above configuration, the mass of the first- and second-direction movable electrodes is applied to the vicinity of the center of the frame portion (refer to FIG. 4). For that reason, a rotational moment with the axis that passes through the center of the frame portion, and extends in the direction orthogonal to the plane of the semiconductor layer as the axis of rotation can be reduced, and the frame portion (movable portion) can be restrained from rotating. Therefore, a reduction of detection accuracy can be suppressed.

According to a second aspect of the present disclosure, in the acceleration sensor according to the first aspect, a center of the frame portion coincides with a center of the support substrate. The first-direction movable electrode and the first-direction fixed electrode include first and second movable electrode portions and first and second fixed electrode portions, which are disposed point symmetrically with respect to the center of the frame portion, respectively. The second-direction movable electrode and the second-direction fixed electrode include third and fourth movable electrode portions and third and fourth fixed electrode portions, which are disposed point symmetrically with respect to the center of the frame portion, respectively. The acceleration in the first direction is detected according to a difference between a first capacitance between the first movable electrode portion and the first fixed electrode portion and a second capacitance between the second movable electrode portion and the second fixed electrode portion. The acceleration in the second direction is detected according to a difference between a third capacitance between the third movable electrode portion and the third fixed electrode portion and a fourth capacitance between the fourth movable electrode portion and the fourth fixed electrode portion.

According to the above configuration, even if the support substrate is strained by thermal strain, the reduction of the detection accuracy due to the thermal strain can be suppressed.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
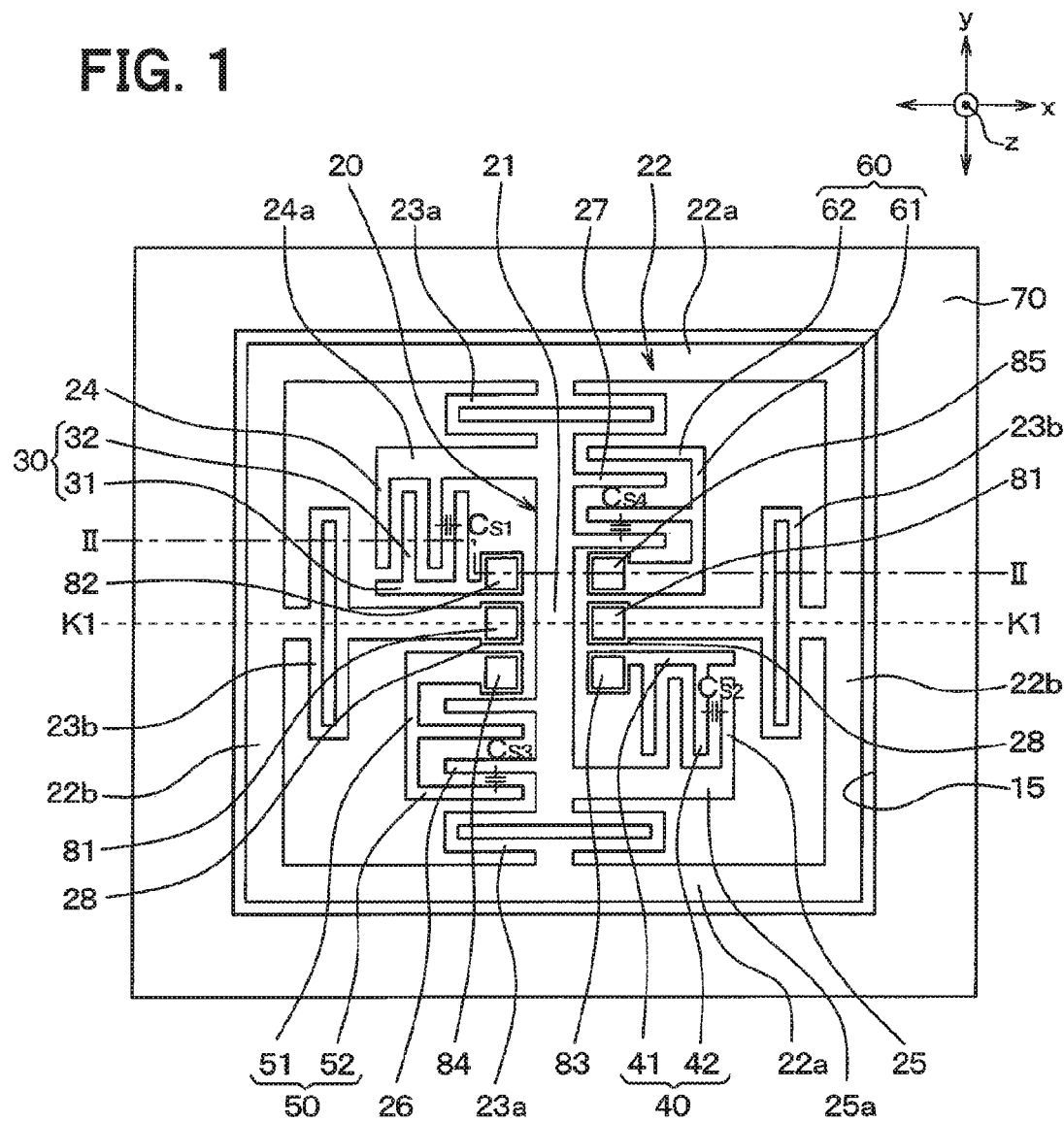
FIG. 1 is a top view of an acceleration sensor according to a first embodiment of the present disclosure.

Hereinafter, embodiments according to the present disclosure will be described with reference to the drawings. In each of the following embodiments, the description will be provided using the same reference numerals for the same or equivalent portions.

First Embodiment

Figure 2:
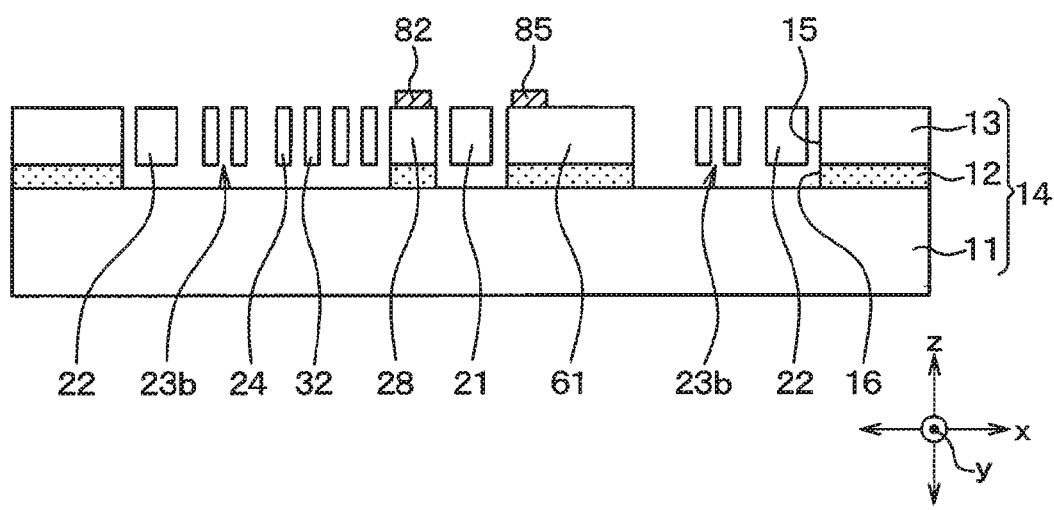
FIG. 2 is a cross-sectional view taken along a line II-II in FIG. 1.

First Embodiment of the present disclosure will be described with reference to the drawings. As illustrated in FIGS. 1 and 2, an acceleration sensor according to the present embodiment is configured by an SOI (silicon on insulator) substrate 14 in which a semiconductor layer 13 is stacked over a support substrate 11 through an insulating film 12.

In the present embodiment, the SOI substrate 14 corresponds to a semiconductor substrate. The support substrate 11 is formed of, for example, a silicon substrate. The insulating film 12 is made of $SiO_2$ or SiN, and the semiconductor layer 13 is made of a silicon substrate or a polysilicon.

The semiconductor layer 13 is micromachined to be formed with groove portions 15. A movable portion 20 and first to fourth fixing portions 30 to 60 are partitioned and formed by the groove portions 15 in the semiconductor layer 13. In the semiconductor layer 13, a portion not partitioned by the groove portions 15 provides a peripheral portion 70.

The insulating film 12 is formed with a recess part 16 in which portions corresponding to the movable portion 20 and the first to fourth fixing portions 30 to 60 are removed. With this configuration, predetermined areas of the movable portion 20 and the first to fourth fixing portions 30 to 60 in the semiconductor layer 13 are released from the support substrate 11.

Now, each of an x-axis direction, a y-axis direction, and a z-axis direction in FIGS. 1 and 2 will be described. In FIGS. 1 and 2, the x-axis direction corresponds to a horizontal direction of a paper surface in FIG. 1, the y-axis direction is a direction orthogonal to the x-axis direction in a surface of the SOI substrate 14, and the z-axis direction is a direction orthogonal to the x-axis direction and the y-axis direction. In the present embodiment, the x-axis direction corresponds to a first direction, and the y-axis direction corresponds to a second direction.

The movable portion 20 includes a weight portion 21 disposed to cross over the recess part 16, a frame portion 22 that supports the weight portion 21, first and second beam portions 23a and 23b provided on the frame portion 22, and first to fourth movable electrode portions 24 to 27.

The weight portion 21 is shaped into a rectangular rod, and both ends of the weight portion 21 in a longitudinal direction are supported to the frame portion 22 through the first beam portions 23a. Specifically, a longitudinal direction of the weight portion 21 is parallel to the y-axis direction, and the weight portion 21 is supported by the frame portion 22 so as to pass through a center of the frame portion 22.

In the present embodiment, the frame portion 22 is shaped into a rectangular frame, and has a pair of first side portions 22a extending in the x-axis direction, and a pair of second side portions 22b extending in the y-axis direction. The frame portion 22 is formed so that a center of the frame portion 22 coincides with a center of the support substrate 11 (semiconductor layer 13).

The first and second beam portions 23a and 23b each have a rectangular frame shape in which two parallel beams are connected to each other at both ends of those beams, and have a spring function of causing displacement in a direction orthogonal to a longitudinal direction of the two beams. The first beam portions 23a are provided between the respective first side portions 22a of the frame portion 22 and the respective ends of the weight portion 21 to allow the weight portion 21 to displace in the y-axis direction when an acceleration including a component in the y-axis direction is applied to the first beam portions 23a, and to restore the weight portion 21 to an original state according to a loss of the acceleration. The second beam portions 23b are provided on the respective second side portions 22b of the frame portion 22 to allow the frame portion 22 to displace in the x-axis direction when an acceleration including a component in the x-axis direction is applied to the second beam portions 23b, and to restore the frame portion 22 to an original state according to a loss of the acceleration. In the present embodiment, the second beam portions 23b are formed linearly symmetrically with respect to the weight portion 21, and formed inside of the respective second side portions 22b of the frame portion 22.

Anchor portions 28 supported by the support substrate 11 through the insulating film 12 are formed on opposite sides of the respective second side portions 22b of the frame portion 22 with respect to the second beam portions 23b. The frame portion 22 is supported to the support substrate 11 through the anchor portions 28. In other words, the frame portion 22 is supported to the support substrate 11 by the anchor portions 28 formed inside of the frame portion 22. In the present embodiment, the anchor portions 28 connected to the respective second beam portions 23b are formed linearly symmetrically with respect to the weight portion 21.

In the present embodiment, the first and second movable electrode portions 24, 25, and the third and fourth movable electrode portions 26, 27 are provided on the weight portion 21 two by two so as to be point symmetrical with respect to the center of the frame portion 22, respectively.

Specifically, the weight portion 21 is provided with first and second support portions 24a and 25a which project from both side surfaces of the weight portion 21 toward directions opposite to each other so as to be point symmetrical with respect to the center of the frame portion 22. The first and second movable electrode portions 24 and 25 are provided on the first and second support portions 24a and 25a so as to project from the first and second support portions 24a and 25a toward a first virtual line K1 that passes through the center of the frame portion 22, and extends in a direction parallel to the x-axis direction. The third and fourth movable electrode portions 26 and 27 are provided on the weight portion 21 so as to project from both side surfaces of the weight portion 21 in directions opposite to each other.

In other words, in the present embodiment, the first and second movable electrode portions 24 and 25 are extended in a direction parallel to the y-axis direction, and the third and fourth movable electrode portions 26 and 27 are extended in a direction parallel to the x-axis direction. In the present embodiment, the first and second movable electrode portions 24 and 25 correspond to a first-direction movable electrode, and the third and fourth movable electrode portions 26 and 27 correspond to a second-direction movable electrode. The first and second support portions 24a and 25a correspond to a first-direction support portion.

The first to fourth fixing portions 30 to 60 include first to fourth wiring parts 31 to 61 that are supported by the insulating film 12, and first to fourth fixed electrode portions 32 to 62 that are supported to the first to fourth wiring parts 31 to 61, and formed to mesh with comb teeth of the first to fourth movable electrode portions 24 to 27. Those first to fourth fixing portions 30 to 60 are formed point symmetrical with respect to the center of the frame portion 22 (support substrate 11).

In the present embodiment, the first and second fixed electrode portions 32 and 42 correspond to a first-direction fixed electrode, and the third and fourth fixed electrode portions 52 and 62 correspond to a second-direction fixed electrode.

The anchor portions 28 and the first to fourth wiring parts 31 to 61 of the semiconductor layer 13 are formed with pads 81 to 85, respectively, which are electrically connected to an external circuit through a wire. Although not shown, in FIG. 1, a pad may be formed on the peripheral portion 70 in the semiconductor layer 13, and the peripheral portion 70 may be fixed to a predetermined potential.

A structure of the acceleration sensor according to the present embodiment is described hereinabove. Next, a method of manufacturing the acceleration sensor of this type will be described with reference to FIGS. 3A to 3D. FIGS. 3A to 3D corresponds to cross-sectional views taken along a line II-II in FIG. 1.

Figure 3A:
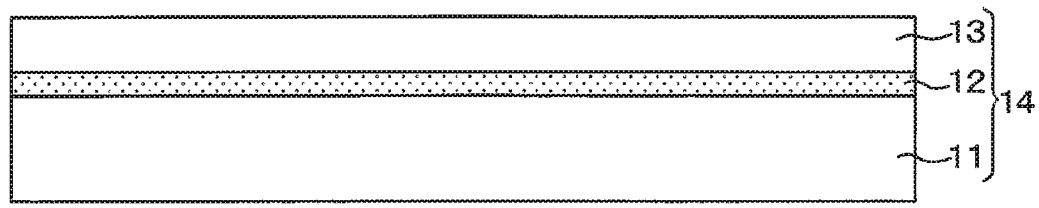
FIGS. 3A to 3D are cross-sectional views for illustrating a process of manufacturing an acceleration sensor illustrated in FIG. 1.

First, as illustrated in FIG. 3A, the SOI substrate 14 in which the support substrate 11, the insulating film 12, and the semiconductor layer 13 are stacked on top of another in order is prepared.

Figure 3B:
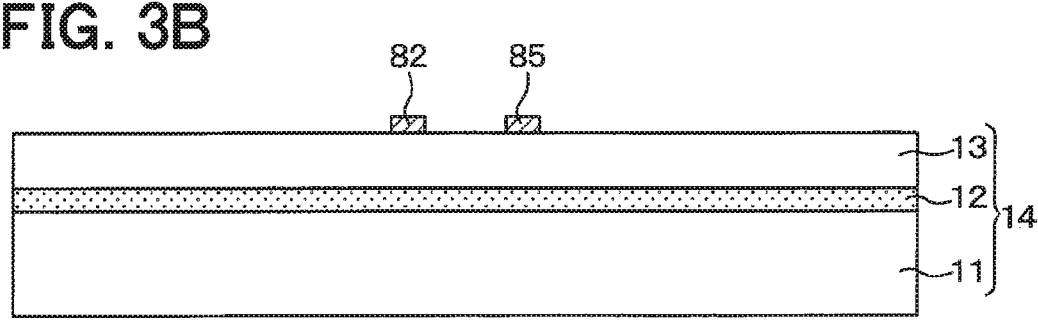

As illustrated in FIG. 3B, a metal film is formed on the semiconductor layer 13 through a CVD technique or the like. Then, the metal film is appropriately patterned with the use of a mask or the like, not shown, to form the pads 81 to 85. The pads 81, 83, and 84 are formed in a cross-section different from that of FIG. 3B.

Figure 3C:
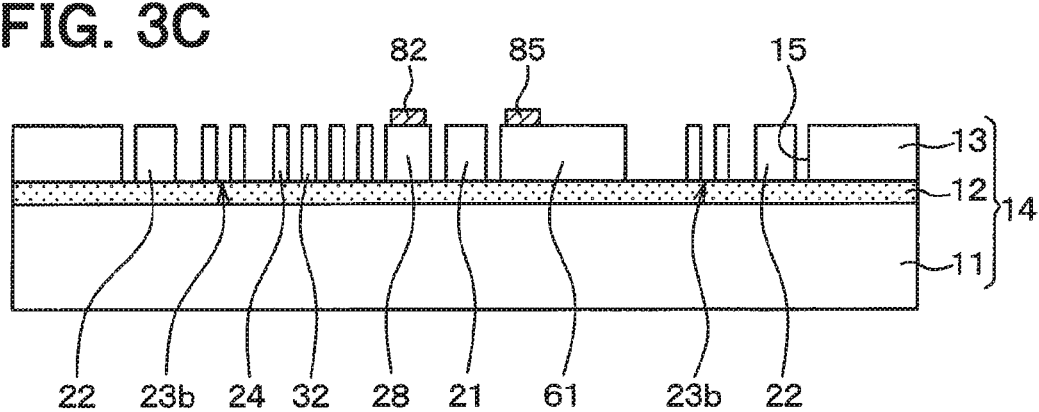

Subsequently, as illustrated in FIG. 3C, a mask (not illustrated) such as a resist or an oxide film is formed on the semiconductor layer 13. The groove portions 15 are defined in the semiconductor layer 13 by reactive ion etching with the use of the mask, to thereby form the movable portion 20 and the first to fourth fixing portions 30 to 60.

Figure 3D:
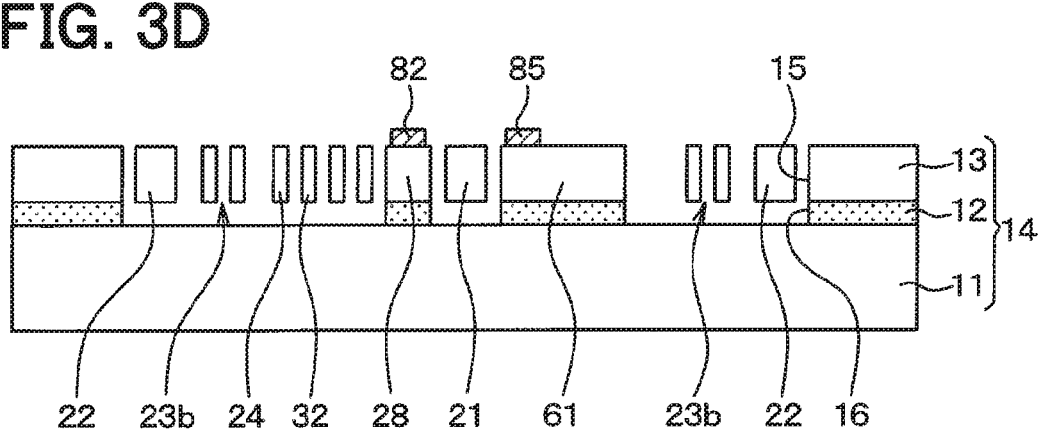

Thereafter, as illustrated in FIG. 3D, a predetermined area of the insulating film 12 is removed through wet etching, to thereby release predetermined areas of the movable portion 20 and the first to fourth fixing portions 30 to 60 from the support substrate 11. In other words, the predetermined area of the insulating film 12 is subjected to sacrifice layer etching. As a result, the acceleration sensor is manufactured.

Next, the operation of the above acceleration sensor will be described. In the acceleration sensor, in detecting the acceleration, a predetermined potential is applied to the first to fourth movable electrode portions 24 to 27 (pad 81) and the first to fourth fixed electrode portions 32 to 62 (pads 82 to 85). A potential (carrier wave) different in phase from each other by 180° is applied to the first and second fixed electrode portions 32 and 42 (pads 82, 83), and a potential (carrier wave) different in phase from each other by 180° is applied to the third and fourth fixed electrode portions 52 and 62 (pads 84, 85).

As indicated by capacitor symbols in FIG. 1, a first capacitance $C_{s1}$ is generated between the first movable electrode portion 24 and the first fixed electrode portion 32, and a second capacitance $C_{s2}$ is generated between the second movable electrode portion 25 and the second fixed electrode portion 42. Likewise, a third capacitance $C_{s3}$ is generated between the third movable electrode portion 26 and the fourth fixed electrode portion 52, and a fourth capacitance $C_{s4}$ is generated between the fourth movable electrode portion 27 and the fourth fixed electrode portion 62.

For that reason, when the acceleration in the x-axis direction is applied, the first and second capacitances $C_{s1}$ and $C_{s2}$ are changed with a displacement of the first and second movable electrode portions 24 and 25. When the acceleration in the y-axis direction is applied, the third and fourth capacitances $C_{s3}$ and $C_{s4}$ are changed with a displacement of the third and fourth movable electrode portions 26 and 27. Therefore, the acceleration in the x-axis direction is detected on the basis of a difference between the first and second capacitances $C_{s1}$ and $C_{s2}$, and the acceleration in the y-axis direction is detected on the basis of a difference between the third and fourth capacitances $C_{s3}$ and $C_{s4}$.

Figure 4:
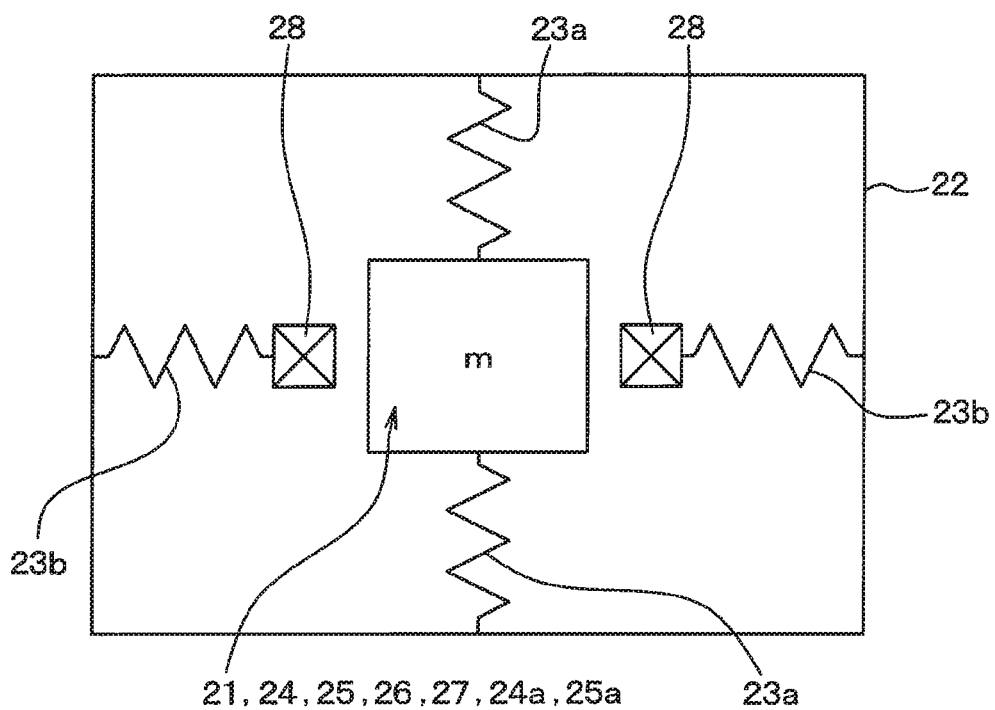
FIG. 4 is a diagram illustrating an equivalent model of a movable portion illustrated in FIG. 1.

As described above, in the present embodiment, the weight portion 21 is formed to pass through the center of the frame portion 22, and the weight portion 21 is provided with the first to fourth movable electrode portions 24 to 27. For that reason, as illustrated in FIG. 4, a mass m of the first to fourth movable electrode portions 24 to 27 (first and second support portions 24a and 25a) is applied to the vicinity of the center of the frame portion 22. Therefore, a rotational moment with the axis that passes through the center of the frame portion 22, and extends in the z-axis direction as an axis of rotation can be reduced. In other words, a rotation resonance can be increased. For that reason, the frame portion 22 can be restrained from rotating, and the detection accuracy can be restrained from being reduced.

In the acceleration sensor according to the present embodiment, the first to fourth fixing portions 30 to 60 are formed point symmetrical with respect to the center of the support substrate 11 (frame portion 22). For that reason, the detection accuracy can be restrained from being reduced by thermal strain.

Figure 5:
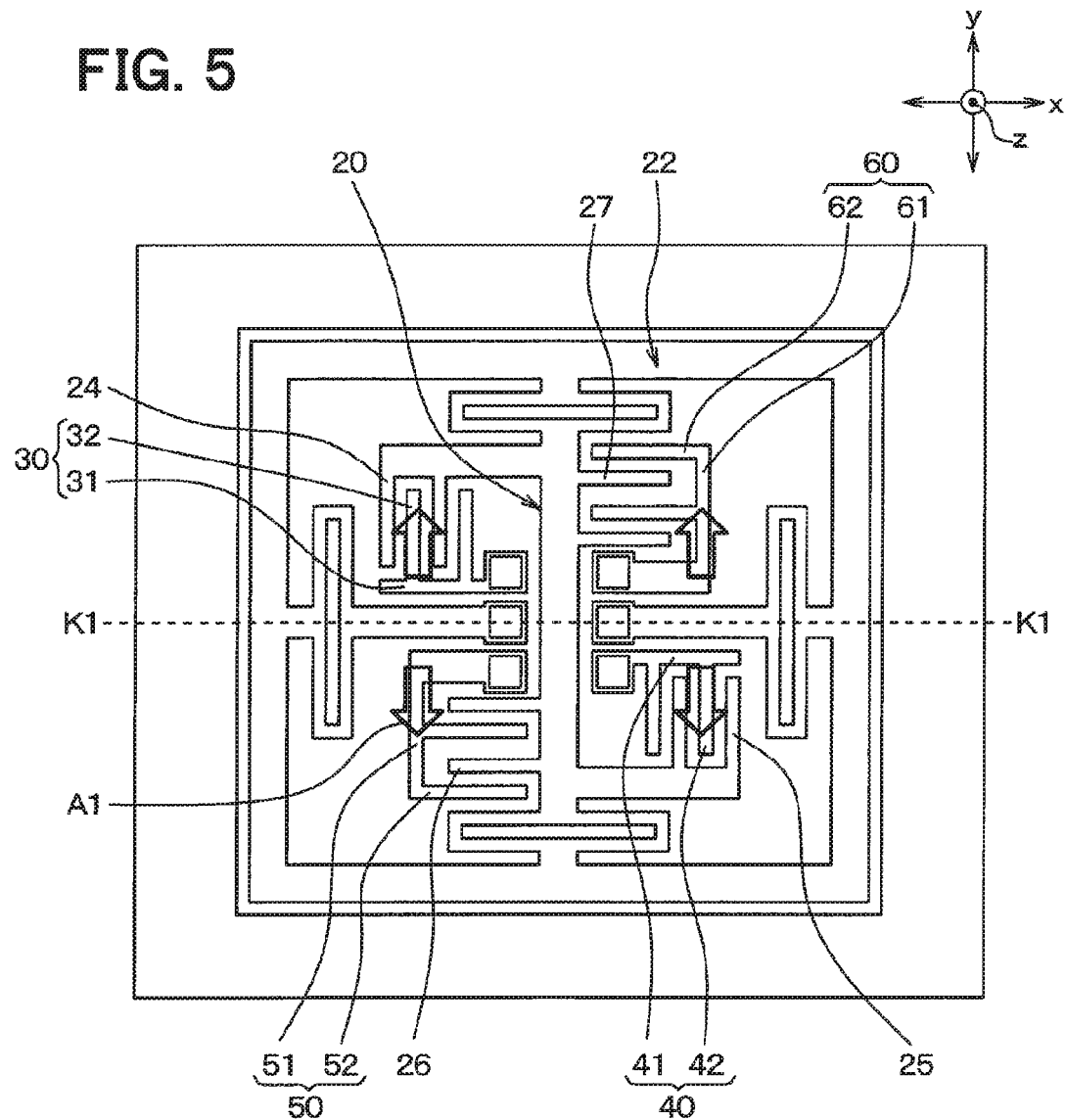
FIG. 5 is a schematic view for illustrating displacement directions of first to fourth fixing portions when a support substrate is strained with respect to a first virtual line.

In other words, as illustrated in FIG. 5, when the support substrate 11 is deformed symmetrically with respect to the x-axis so as to be convex toward the semiconductor layer 13 with the first virtual line K1 as a center axis, the first to fourth wiring parts 31 to 61 (first to fourth fixed electrode portions 32 to 62) are so strained as to be separated from the first virtual line K1 (refer to arrows A1 in FIG. 5).

In that case, respective facing areas of the first and second movable electrode portions 24, 25, and the first and second fixed electrode portions 32, 42 are increased. Respective intervals between the third and fourth movable electrode portions 26, 27, and the third and fourth fixed electrode portions 52, 62 become longer. For that reason, when it is assumed that $C_0$ is an initial capacitance, $\Delta C_{t1}$ is a thermal strain term related to a change in the facing area of the respective electrode portions caused by the thermal strain, and $\Delta C_{t2}$ is a thermal strain term related to a change in the interval of the respective electrode portions caused by the thermal strain, the first to fourth capacitances $C_{s1}$ to $C_{s4}$ are represented by the following Expressions.

$$C_{s1}=C_0+\Delta C_{t1} \tag{Ex. 1}$$

$$C_{s2}=C_0+\Delta C_{t1} \tag{Ex. 2}$$

$$C_{s3}=C_0-\Delta C_{t2} \tag{Ex. 3}$$

$$C_{s4}=C_0-\Delta C_{t2} \tag{Ex. 4}$$

Therefore, $\Delta C_{t1}$ and $\Delta C_{t2}$ are canceled when the acceleration is detected on the basis of the difference between the first and second capacitances $C_{s1}$ and $C_{s2}$, and the difference between the third and fourth capacitances $C_{s3}$ and $C_{s4}$ as described above. The first to fourth movable electrode portions 24 to 27 are hardly displaced because an influence (stress) caused by the thermal strain is relaxed by the first and second beam portions 23a and 23b.

Figure 6:
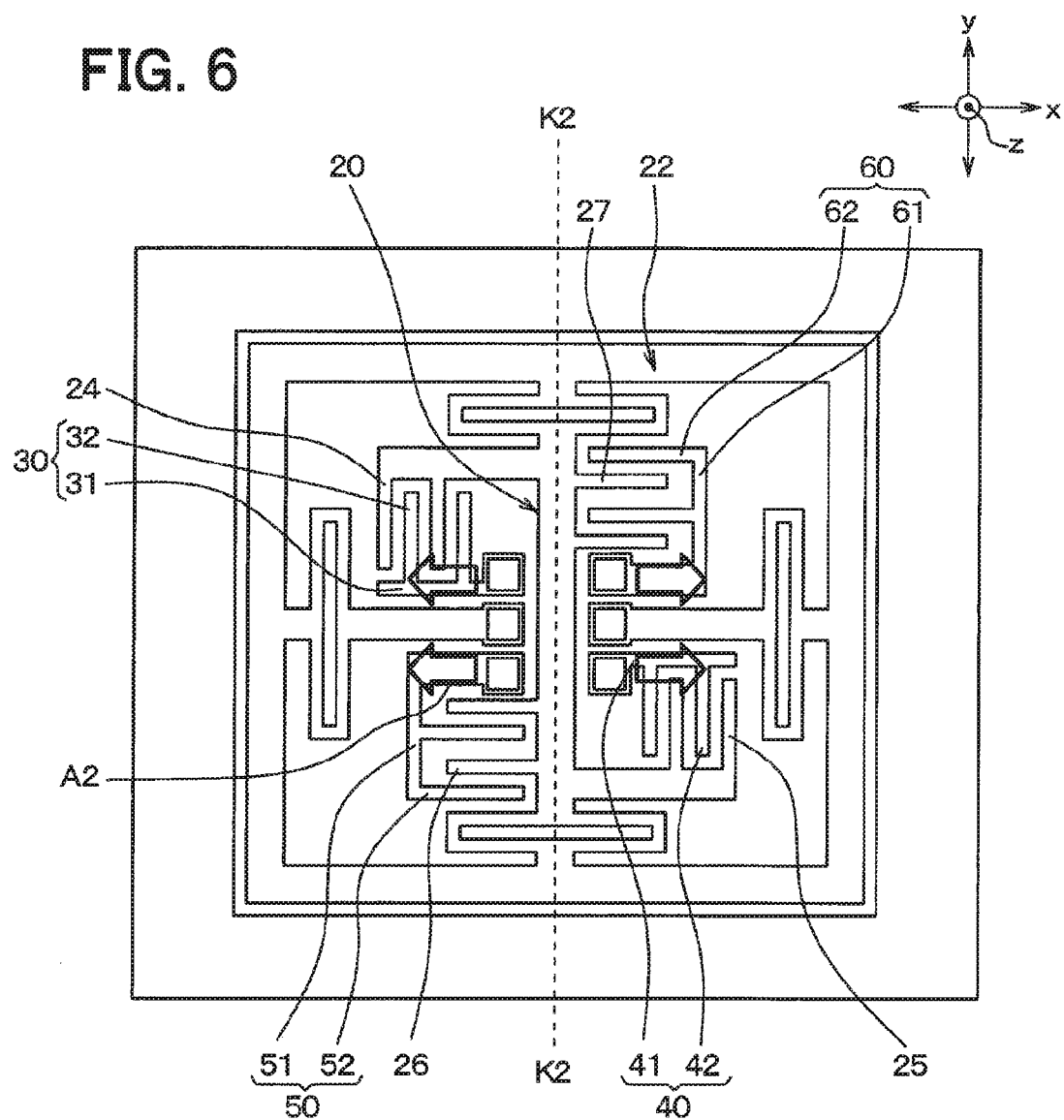
FIG. 6 is a schematic view for illustrating the displacement directions of the first to fourth fixing portions when the support substrate is strained with respect to a second virtual line.

As illustrated in FIG. 6, it is assumed that a virtual line that passes through the center of the support substrate 11 (frame portion 22) and extends in a direction parallel to the y-axis direction is a second virtual line K2. In this case, when the support substrate 11 is deformed symmetrically with respect to the y-axis so as to be convex toward the semiconductor layer 13 with the second virtual line K2 as a center axis, the first to fourth wiring parts 31 to 61 (first to fourth fixed electrode portions 32 to 62) are so strained as to be separated from the second virtual line K2 (refer to arrows A2 in FIG. 6).

In this case, respective intervals between the first and second movable electrode portions 24, 25, and the first and second fixed electrode portions 32, 42 become shorter. Respective facing areas of the third and fourth movable electrode portions 26, 27, and the third and fourth fixed electrode portions 52, 62 are decreased. For that reason, the first to fourth capacitances $C_{s1}$ to $C_{s4}$ are represented by the following Expressions.

$$C_{s1} = C_0 + \Delta C_{t2} \quad \text{(Ex. 5)}$$

$$C_{s2} = C_0 + \Delta C_{t2} \quad \text{(Ex. 6)}$$

$$C_{s3} = C_0 - \Delta C_{t1} \quad \text{(Ex. 7)}$$

$$C_{s4} = C_0 - \Delta C_{t1} \quad \text{(Ex. 8)}$$

Therefore, $\Delta C_{t1}$ and $\Delta C_{t2}$ are canceled when the acceleration is detected on the basis of the difference between the first and second capacitances $C_{s1}$ and $C_{s2}$, and the difference between the third and fourth capacitances $C_{s3}$ and $C_{s4}$ as described above.

Figure 7:
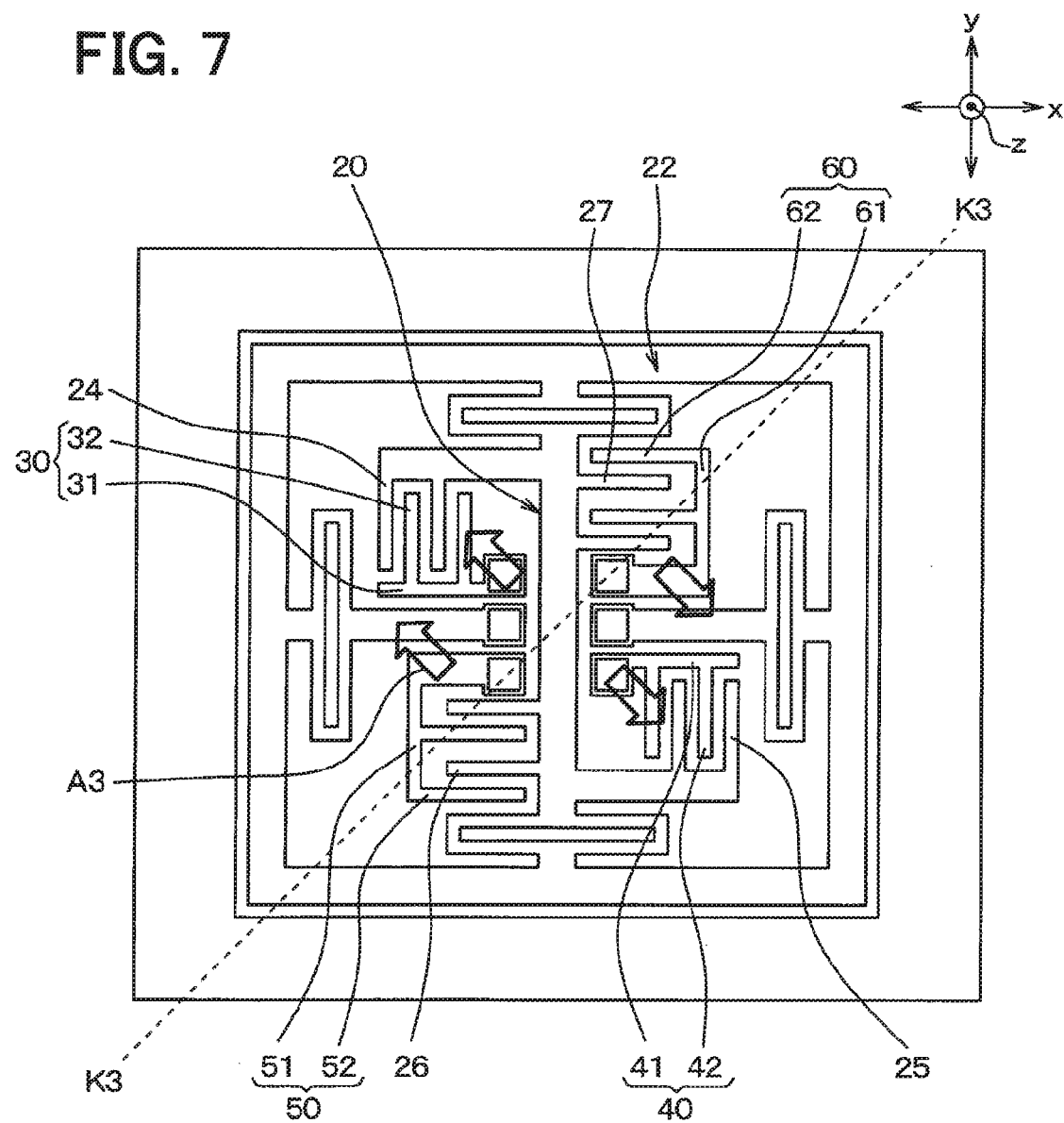
FIG. 7 is a schematic view for illustrating the displacement directions of the first to fourth fixing portions when the support substrate is strained with respect to a third virtual line.

Further, as illustrated in FIG. 7, it is assumed that a virtual line that passes through the center of the semiconductor layer 13, and is inclined from the x-axis direction and the y-axis direction by 45° is a third virtual line K3. In this case, when the support substrate 11 is deformed symmetrically with respect to a diagonal axis so as to be convex toward the semiconductor layer 13 with the third virtual line K3 as a center axis, the first to fourth wiring parts 31 to 61 (first to fourth fixed electrode portions 32 to 62) are so strained as to be separated from the third virtual line K3 (refer to arrows A3 in FIG. 7).

In that case, the first and second movable electrode portions 24, 25, and the first and second fixed electrode portions 32, 42 become shorter in the respective intervals, and become increased in the respective facing areas. The third and fourth movable electrode portions 26, 27, and the third and fourth fixed electrode portions 52, 62 become shorter in the respective intervals, and become decreased in the respective facing areas. For that reason, the first to fourth capacitances $C_{s1}$ to $C_{s4}$ are represented by the following Expressions.

$$C_{s1} = C_0 + \Delta C_{t1} + \Delta C_{t2} \quad \text{(Ex. 9)}$$

$$C_{s2} = C_0 + \Delta C_{t1} + \Delta C_{t2} \quad \text{(Ex. 10)}$$

$$C_{s3} = C_0 - \Delta C_{t1} + \Delta C_{t2} \quad \text{(Ex. 11)}$$

$$C_{s4} = C_0 - \Delta C_{t1} + \Delta C_{t2} \quad \text{(Ex. 12)}$$

Therefore. $\Delta C_{t1}$ and $\Delta C_{t2}$ are canceled when the acceleration is detected on the basis of the difference between the first and second capacitances $C_{s1}$ and $C_{s2}$, and the difference between the third and fourth capacitances $C_{s3}$ and $C_{s4}$ as described above.

With the above configuration, according to the acceleration sensor of the present embodiment, the detection accuracy can be restrained from being reduced by the thermal strain.

The case in which the support substrate 11 is deformed to be convex toward the semiconductor layer 13 has been described above. However, likewise in the case where the support substrate 11 is deformed to be concaved toward the semiconductor layer 13, the acceleration is detected on the basis of the difference between the first and second capacitances $C_{s1}$ and $C_{s2}$, and the difference between the third and fourth capacitances $C_{s3}$ and $C_{s4}$, to thereby cancel the thermal strain term.

Further, in the acceleration sensor of the present embodiment, because the respective anchor portions 28 are arranged inside of the frame portion 22, the distances between the respective anchor portions 28 can be shortened as compared with a case in which the respective anchor portions 28 are formed outside of the frame portion 22. For that reason, when the support substrate 11 is strained by the thermal strain, a difference in a stress to be applied to the respective anchor portions 28 can be reduced. Therefore, the stress to be transmitted to the second beam portions 23b through the anchor portions 28 can be restrained from being varied.

Furthermore, the first and second beam portions 23a and 23b are shaped into a rectangular frame in which two parallel beams are connected to each other at both ends of those beams. For that reason, for example, as compared with a case in which the first and second beam portions 23a and 23b have a polygonal-shaped spring function, rigidity can be increased, and the stress when the support substrate 11 is strained by the thermal strain can be restrained from being transmitted to the frame portion 22. In other words, the frame portion 22 can be restrained from being strained by the thermal strain.

Second Embodiment

A second embodiment of the present disclosure will be described. In the present embodiment, formation locations of the second and third movable electrode portions 25, 26, and the second and third fixed electrode portions 42, 52 are changed from those of the first embodiment, and the other configurations are identical with those in the first embodiment, and their description will be omitted.

Figure 8:
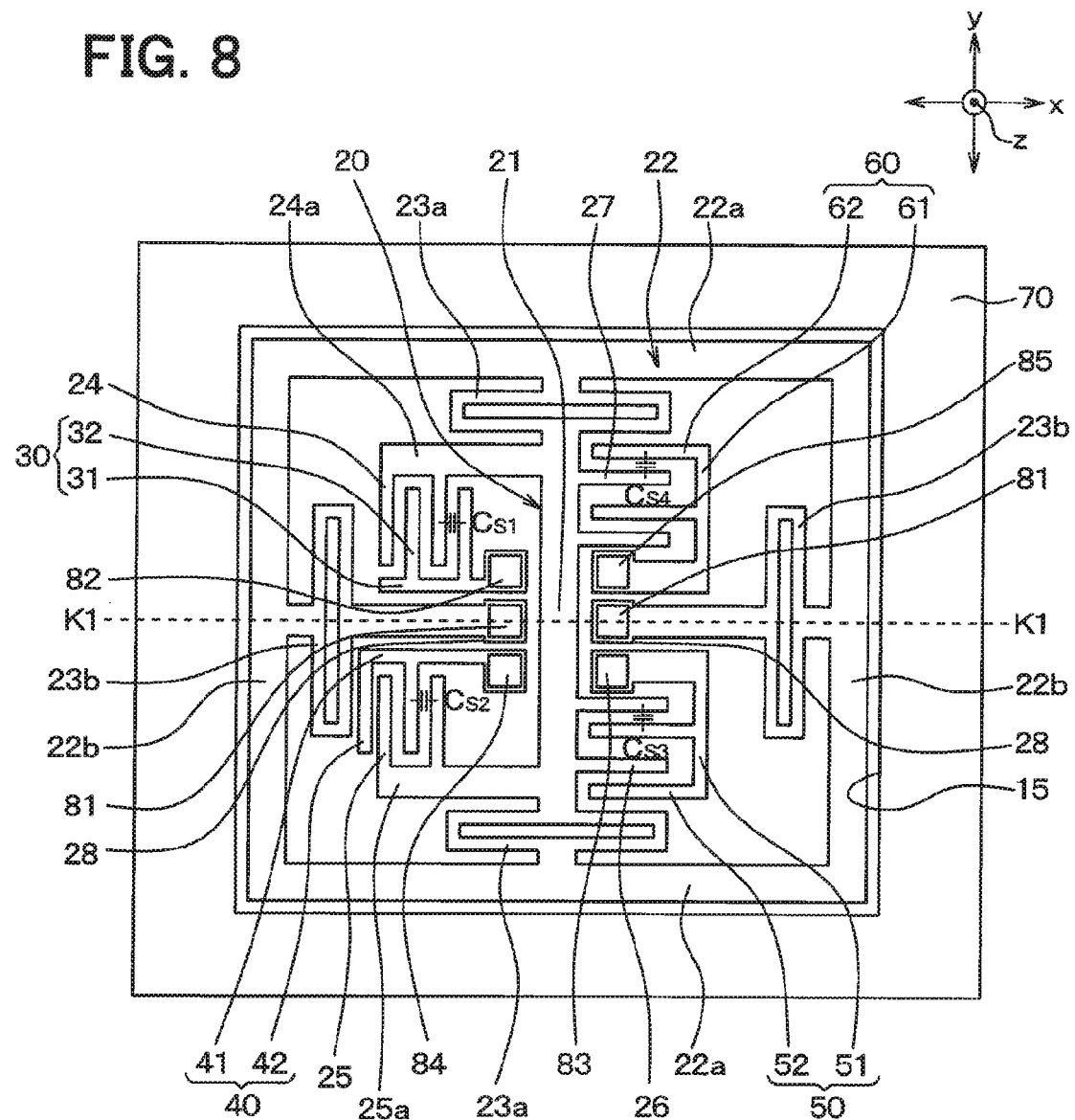
FIG. 8 is a top view of an acceleration sensor according to a second embodiment of the present disclosure.

As illustrated in FIG. 8, in the present embodiment, the first and second movable electrode portions 24 and 25 are provided on the weight portion 21, and the third and fourth movable electrode portions 26 and 27 are provided on the weight portion 21, so as to be linearly symmetrical with respect to the first virtual line K1.

Likewise, the third and fourth fixing portions 50 and 60 are formed linearly symmetrically with respect to the first virtual line K1. The first and second fixing portions 30 and 40 are so formed as to be substantially linearly symmetrical with respect to the first virtual line K1. The "formed substantially linearly symmetrically" means that, although an array of the first movable electrode portion 24 and the first fixed electrode portion 32 in the x-axis direction is opposite to an array of the second movable electrode portion 25 and the second fixed electrode portion 42 in the x-axis direction, distances from the first virtual line K1 to the first and second fixing portions 30 and 40 are equal to each other, and the first and second fixing portions 30 and 40 are formed substantially linearly symmetrically.

According to the above configuration, when the acceleration including the component in the x-axis direction from the fourth movable electrode portion 27 toward the first movable electrode portion 24 is applied, the respective facing areas of the third and fourth movable electrode portions 26, 27 and the third and fourth fixed electrode portions 52, 62 are increased due to the displacement of the frame portion 22 caused by the acceleration. For that reason, when it is assumed that $C_0$ is an initial capacitance, $\Delta C_{t3}$ is an acceleration term related to a change in the facing area of the respective electrode portions caused by the component of the x-axis direction, the third and fourth capacitances $C_{s3}$ and $C_{s4}$ are represented by the following Expressions.

$$C_{s3} = C_0 + \Delta C_{t3} \quad \text{(Ex. 13)}$$

$$C_{s4} = C_0 + \Delta C_{t3} \quad \text{(Ex. 14)}$$

Therefore, as described above, $\Delta C_{t3}$ is canceled when the acceleration is detected on the basis of the difference between the third and fourth capacitances $C_{s3}$ and $C_{s4}$. In other words, according to the acceleration sensor of the present embodiment, the other axis (x-axis) sensitivities of the third and fourth movable electrode portions 26, 27, and the third and fourth fixed electrode portions 52, 62 for detecting the acceleration in the y-axis direction can be reduced.

In the acceleration sensor, when the support substrate 11 is deformed symmetrically with respect to the x-axis so as to be convex toward the semiconductor layer 13 with the first virtual line K1 as a center axis (refer to FIG. 5), the respective facing areas of the first and second movable electrode portions 24, 25 and the first and second fixed electrode portions 32, 42 are increased. Likewise, the respective intervals between the third and fourth movable electrode portions 26, 27 and the third and fourth fixed electrode portions 52, 62 become longer. For that reason, when the acceleration is detected on the basis of the difference between the first and second capacitances $C_{s1}$ and $C_{s2}$, the thermal strain term related to a change in the facing area of the respective electrode portions caused by the thermal strain is canceled. When the acceleration is detected on the basis of the difference between the third and fourth capacitances $C_{s3}$ and $C_{s4}$, the thermal strain term related to a change in the interval of the respective electrode portions caused by the thermal strain is canceled.

Further, when the support substrate 11 is deformed symmetrically with respect to the y-axis so as to be convex toward the semiconductor layer 13 with the second virtual line K2 as a center axis (refer to FIG. 6), the respective facing areas of the third and fourth movable electrode portions 26, 27 and the third and fourth fixed electrode portions 52, 62 are decreased. For that reason, when the acceleration is detected on the basis of the difference between the third and fourth capacitances $C_{s3}$ and $C_{s4}$, the thermal strain term related to the facing area of the respective electrode portions caused by the thermal strain is canceled.

In other words, according to the acceleration sensor, the other axis sensitivities of the third and fourth movable electrode portions 26, 27, and the third and fourth fixed electrode portions 52, 62 for detecting the acceleration in the y-axis direction can be reduced. Even if the support substrate 11 is deformed symmetrically with respect to the x-axis with the first virtual line K1 as the center axis, the detection accuracy of the acceleration in the x-axis direction and the y-axis direction can be restrained from being reduced. In addition, even if the support substrate 11 is deformed symmetrically with respect to the y-axis with the second virtual line K2 as the center axis, the detection accuracy of the acceleration in the y-axis direction can be restrained from being reduced.

Third Embodiment

A third embodiment of the present disclosure will be described. In the present embodiment, formation locations of the second and fourth movable electrode portions 25, 27, and the second and fourth fixed electrode portions 42, 62 are changed from those of the first embodiment, and the other configurations are identical with those in the first embodiment, and their description will be omitted.

Figure 9:
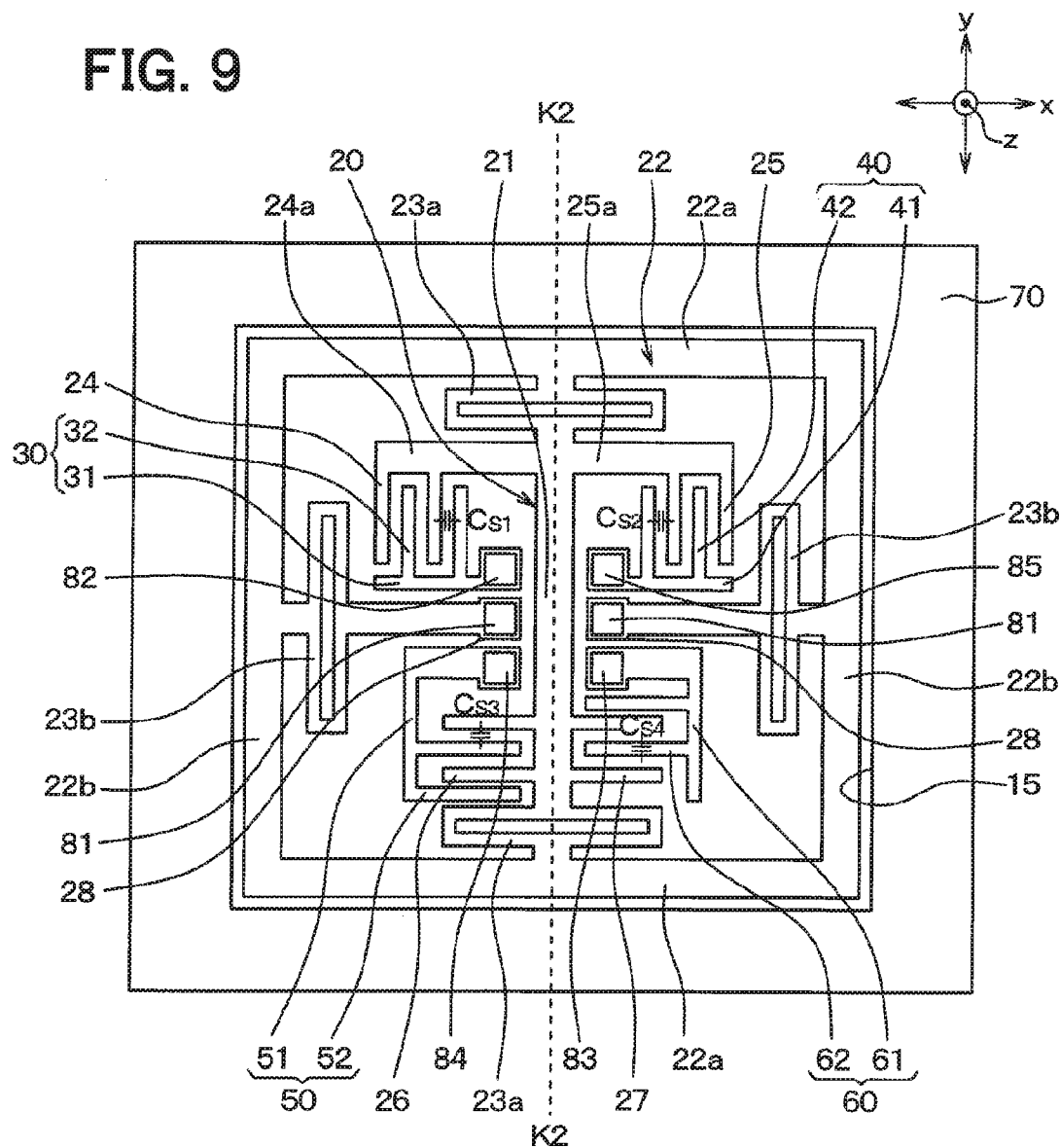
FIG. 9 is a top view of an acceleration sensor according to a third embodiment of the present disclosure.

As illustrated in FIG. 9, in the present embodiment, the first and second movable electrode portions 24 and 25 are provided on the weight portion 21, and the third and fourth movable electrode portions 26 and 27 are provided on the weight portion 21, so as to be linearly symmetrical with respect to the second virtual line K2.

Likewise, the first and second fixing portions 30 and 40 are formed linearly symmetrically with respect to the second virtual line K2. The third and fourth fixing portions 50 and 60 are so formed as to be substantially linearly symmetrical with respect to the second virtual line K2. The "formed substantially linearly symmetrically" means that, although an array of the third movable electrode portion 26 and the third fixed electrode portion 52 in the y-axis direction is opposite to an array of the fourth movable electrode portion 27 and the fourth fixed electrode portion 62 in the y-axis direction, distances from the second virtual line K2 to the third and fourth fixing portions 30 and 40 are equal to each other, and the third and fourth fixing portions 30 and 40 are formed substantially linearly symmetrically.

According to the above configuration, when the acceleration including the component in the y-axis direction from the third movable electrode portion 26 toward the first movable electrode portion 24 is applied, the respective facing areas of the first and second movable electrode portions 24, 25 and the first and second fixed electrode portions 32 and 42 are increased due to the displacement of the weight portion 21 caused by the acceleration. For that reason, when it is assumed that $C_0$ is an initial capacitance, $\Delta C_{14}$ is an acceleration term related to a change in the facing area of the respective electrode portions caused by the component of the y-axis direction, the first and second capacitances $C_{s1}$ and $C_{s2}$ are represented by the following Expressions.

$$C_{s1} = C_0 + \Delta C_{t4} \quad \text{(Ex. 15)}$$

$$C_{s2} = C_0 + \Delta C_{t4} \quad \text{(Ex. 16)}$$

Therefore, as described above, $\Delta C_{t4}$ is canceled when the acceleration is detected on the basis of the difference between the first and second capacitances $C_{s1}$ and $C_{s2}$. In other words, according to the acceleration sensor of the present embodiment, the other axis (y-axis) sensitivities of the first and second movable electrode portions 24, 25, and the first and second fixed electrode portions 32, 42 for detecting the acceleration in the x-axis direction can be reduced.

In the acceleration sensor, when the support substrate 11 is deformed symmetrically with respect to the x-axis so as to be convex toward the semiconductor layer 13 with the first virtual line K1 as a center axis (refer to FIG. 5), the respective facing areas of the first and second movable electrode portions 24, 25 and the first and second fixed electrode portions 32, 42 are increased. For that reason, when the acceleration is detected on the basis of the difference between the first and second capacitances $C_{s1}$ and $C_{s2}$, the thermal strain term related to the facing area of the respective electrode portions caused by the thermal strain is canceled.

Further, when the support substrate 11 is deformed symmetrically with respect to the y-axis so as to be convex toward the semiconductor layer 13 with the second virtual line K2 as a center axis (refer to FIG. 6), the respective intervals of the first and second movable electrode portions 24, 25 and the first and second fixed electrode portions 32, 42 become shorter. Likewise, respective facing areas of the third and fourth movable electrode portions 26, 27, and the third and fourth fixed electrode portions 52, 62 are decreased. For that reason, when the acceleration is detected on the basis of the difference between the first and second capacitances $C_{s1}$ and $C_{s2}$, the thermal strain term related to the interval of the respective electrode portions caused by the thermal strain is canceled. Further, when the acceleration is detected on the basis of the difference between the third and fourth capacitances $C_{s3}$ and $C_{s4}$, the thermal strain term related to the facing area of the respective electrode portions caused by the thermal strain is canceled.

In other words, according to the acceleration sensor, the other axis sensitivities of the first and second movable electrode portions 24, 25, and the first and second fixed electrode portions 32, 42 for detecting the acceleration in the x-axis direction can be reduced. Even if the support substrate 11 is deformed symmetrically with respect to the x-axis with the first virtual line K1 as the center axis, the detection accuracy of the acceleration in the x-axis direction can be restrained from being reduced. Even if the support substrate 11 is deformed symmetrically with respect to the y-axis with the second virtual line K2 as the center axis, the detection accuracy of the acceleration in the x-axis direction and the y-axis direction can be restrained from being reduced.

Fourth Embodiment

A fourth embodiment of the present disclosure will be described. In the present embodiment, formation locations of the first to fourth movable electrode portions 24 to 27, and the first and fourth fixing portions 30 to 60 are changed from those of the first embodiment, and the other configurations are identical with those in the first embodiment, and their description will be omitted.

Figure 10:
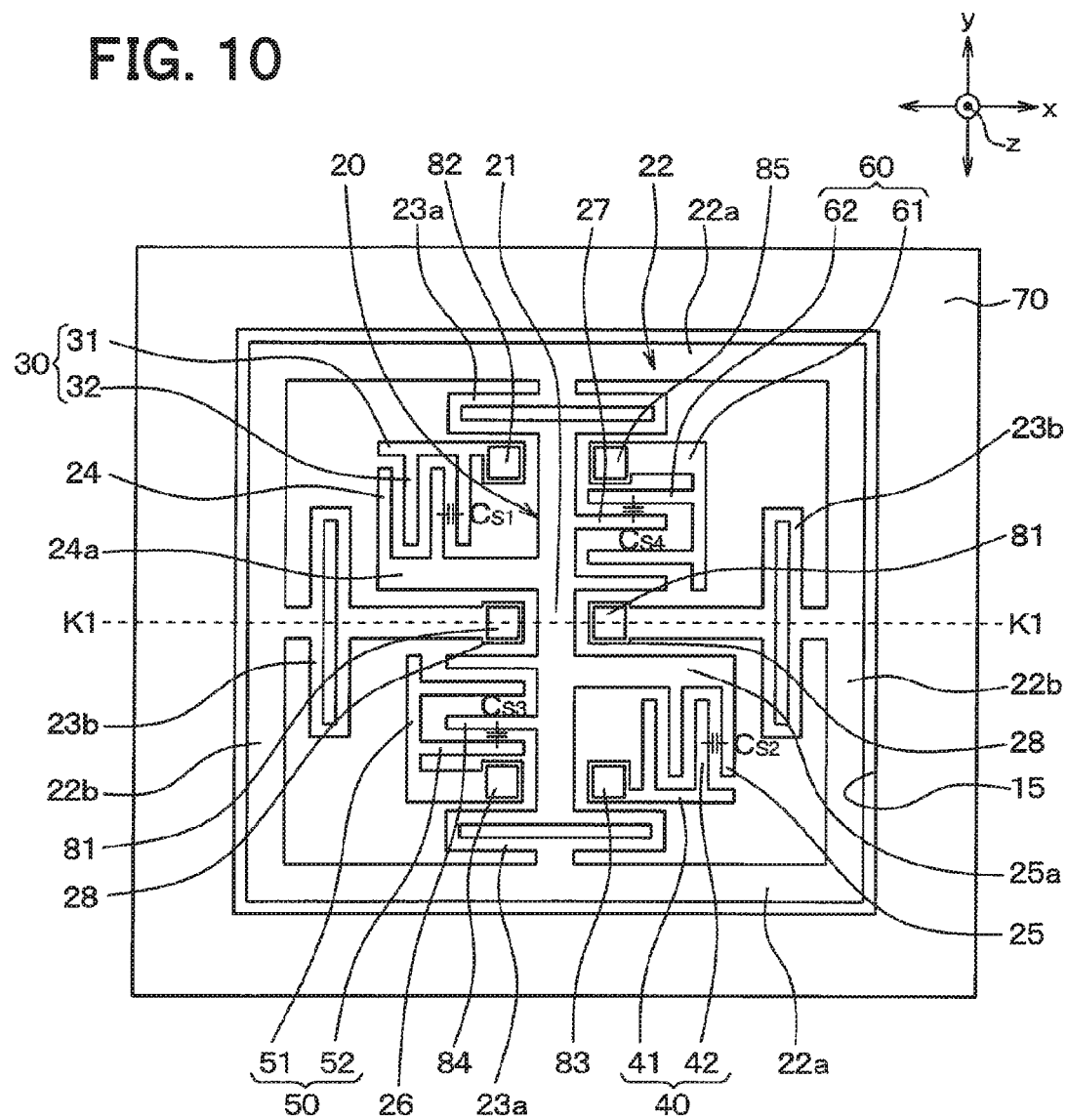
FIG. 10 is a top view of an acceleration sensor according to a fourth embodiment of the present disclosure.

As illustrated in FIG. 10, in the present embodiment, first and second movable electrode portions 24 and 25 are provided on first and second support portions 24a and 25a so as to project from the first and second support portions 24a and 25a in directions opposite to a first virtual line K1. In other words, the first and second support portions 24a and 25a are formed adjacent to the first virtual line K1 as compared with the first and second support portions 24a and 25a in the first embodiment. Likewise, third and fourth movable electrode portions 26 and 27 are formed adjacent to the first virtual line K1 as compared with the third and fourth movable electrode portions 26 and 27 in the first embodiment.

First and second fixed electrode portions 32 and 42 are provided in first and second wiring parts 31 and 41 so as to project from the first and second wiring parts 31 and 41 toward the first virtual line K1. In other words, the first and second wiring parts 31 and 41 are formed at positions further from the first virtual line K1 as compared with the first and second wiring parts 31 and 41 of the first embodiment. Likewise, third and fourth movable electrode portions 50 and 60 are formed at positions further from the first virtual line K1 as compared with the third and fourth fixing portions 50 and 60 in the first embodiment.

According to the above configuration, a mass of the first to fourth movable electrode portions 24 to 27 (first and second support portions 24a and 25a) can be further applied to the vicinity of the center of the frame portion 22. For that reason, a rotational moment can be further reduced, and the frame portion 22 can be further restrained from rotating.

Fifth Embodiment

A fifth embodiment of the present disclosure will be described. In the present embodiment, a support substrate 11 is formed with a concave portion as compared with the first embodiment. The other configurations are identical with those in the first embodiment, and therefore their description will be omitted.

Figure 11:
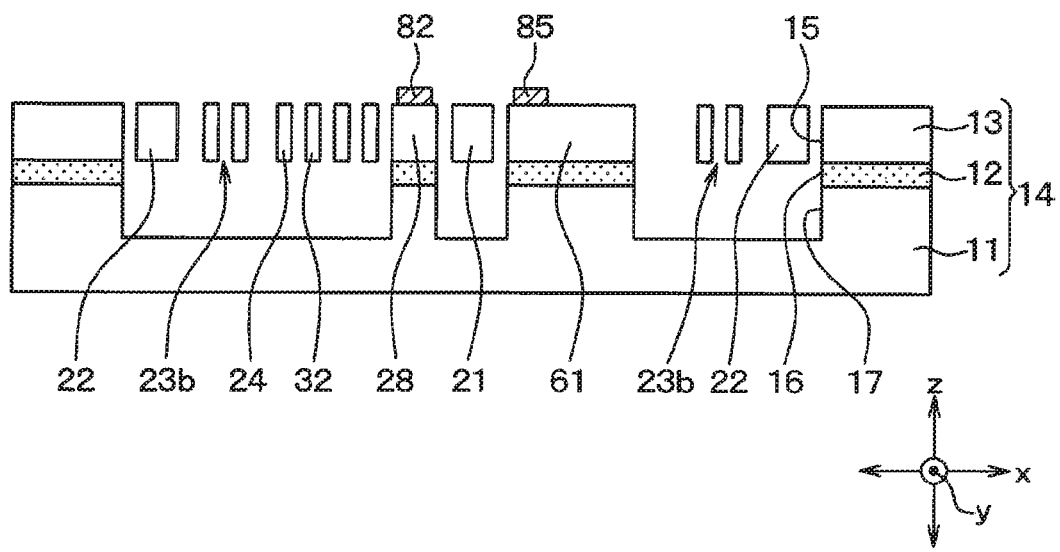
FIG. 11 is a cross-sectional view of an acceleration sensor according to a fifth embodiment of the present disclosure.

In the present embodiment, as illustrated in FIG. 11, a concave portion 17 is formed in a portion exposed from an insulating film 12 in the support substrate 11. In other words, the concave portion 17 is formed in portions of the support substrate 11 facing portions of a movable portion 20 and first to fourth fixing portions 30 to 60 which are released from the support substrate 11. In other words, in the support substrate 11, the concave portion 17 is defined in a portion facing the recess part 16.

According to the above configuration, the same advantages as those in the above first embodiment can be obtained while the portions of the movable portion 20 and the first to fourth fixing portions 30 to 60, which are released from the support substrate 11, are restrained from coming in contact with the support substrate 11.

Sixth Embodiment

A sixth embodiment of the present disclosure will be described. In the present embodiment, a cap is added to the configuration of the first embodiment, and the other configurations are identical with those in the first embodiment, and their description will be omitted.

Figure 12:
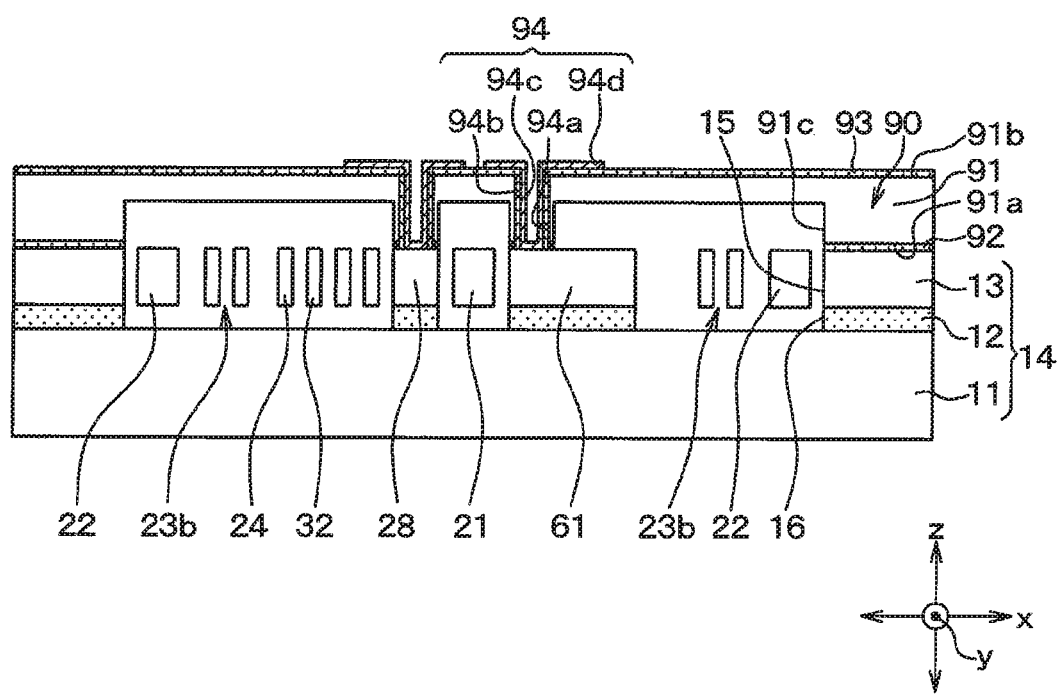
FIG. 12 is a cross-sectional view of an acceleration sensor according to a sixth embodiment of the present disclosure.

As illustrated in FIG. 12, in the present embodiment, a cap 90 that seals a movable portion 20 and first to fourth fixing portions 30 to 60 is disposed on an SOI substrate 14. Specifically, the cap 90 includes a substrate 91 having one surface 91a and the other surface 91b on a side opposite to the one surface 91a, an insulating film 92 formed on the one surface 91a of the substrate 91 adjacent to the SOI substrate 14, and an insulating film 93 formed on the other surface 91b of the substrate 91. The insulating film 92 formed on the one surface 91a of the substrate 91 is joined to the SOI substrate 14. In the present embodiment, pads 81 to 85 are not provided on a semiconductor layer 13, and the insulating film 92 is joined directly to the semiconductor layer 13 of the SOI substrate 14 by bonding.

The substrate 91 is formed of a silicon substrate, and a recess part 91c is formed in a portion of the one surface 91a which faces portions of the movable portion 20 and the first to fourth fixing portions 30 to 60 which are released from the support substrate 11. The recess part 91c is configured to restrain the portions of the movable portion 20 and the first to fourth fixing portions 30 to 60, which are released from the support substrate 11, from coming in contact with the cap 90. In FIG. 12, no insulating film 92 is formed on a wall surface of the recess part 91c, but the insulating film 92 may be formed on the wall surface of the recess part 91c.

Multiple penetration electrode portions 94 which penetrate through the cap 90 in a stacking direction of the SOI substrate 14 and the cap 90 are formed in the cap 90. Specifically, an insulating film 94b is formed on a wall surface of each through-hole 94a that penetrates through the insulating film 93, the substrate 91, and the insulating film 92, and exposes parts of anchor portions 28 and first to fourth wiring parts 31 to 61. A through-hole electrode 94c is formed on each insulating film 94b, and the through-hole electrode 94c is electrically connected to the anchor portions 28 and the first to fourth wiring parts 31 to 61. A portion connected to the through-hole electrode 94c and disposed on the insulating film 93 forms a pad 94d electrically connected to an external circuit through a wire, to thereby form each through-hole electrode portion 94.

According to the above configuration, the same advantages as those in the above first embodiment can be obtained while a foreign matter is restrained from adhering to the movable portion 20, and the first to fourth fixing portions 30 to 60.

Seventh Embodiment

A seventh embodiment of the present disclosure will be described. In the present embodiment, a configuration of the cap 90 is changed as compared with the sixth embodiment. The other configurations are identical with those in the sixth embodiment, and therefore their description will be omitted.

Figure 13:
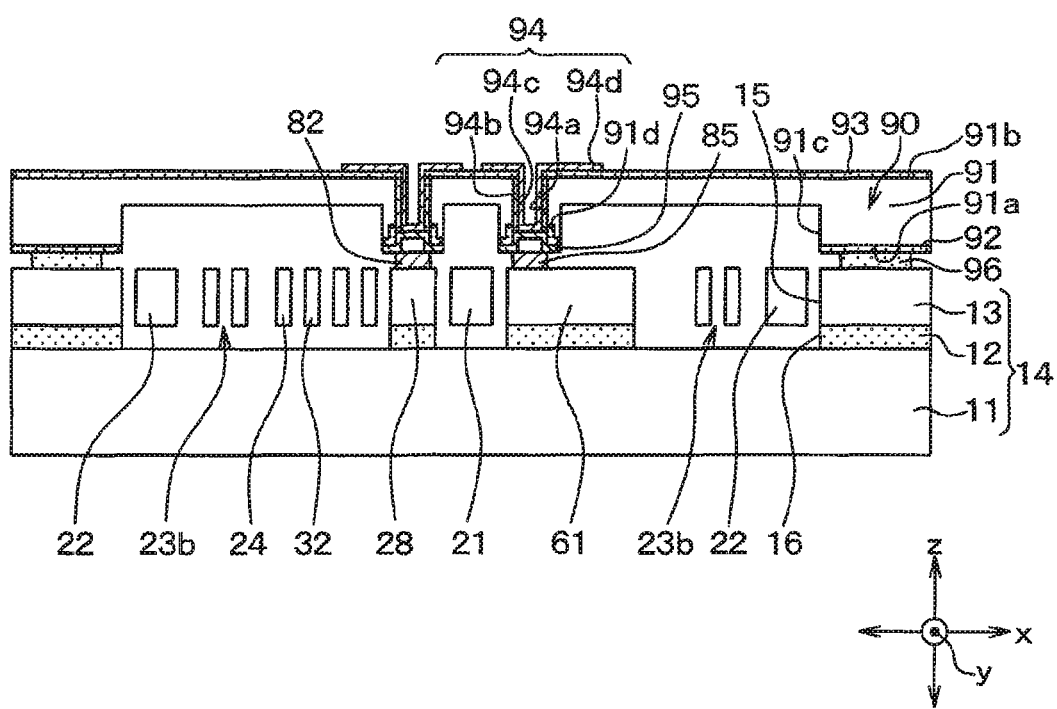
FIG. 13 is a cross-sectional view of an acceleration sensor according to a seventh embodiment of the present disclosure.
Figure 14:
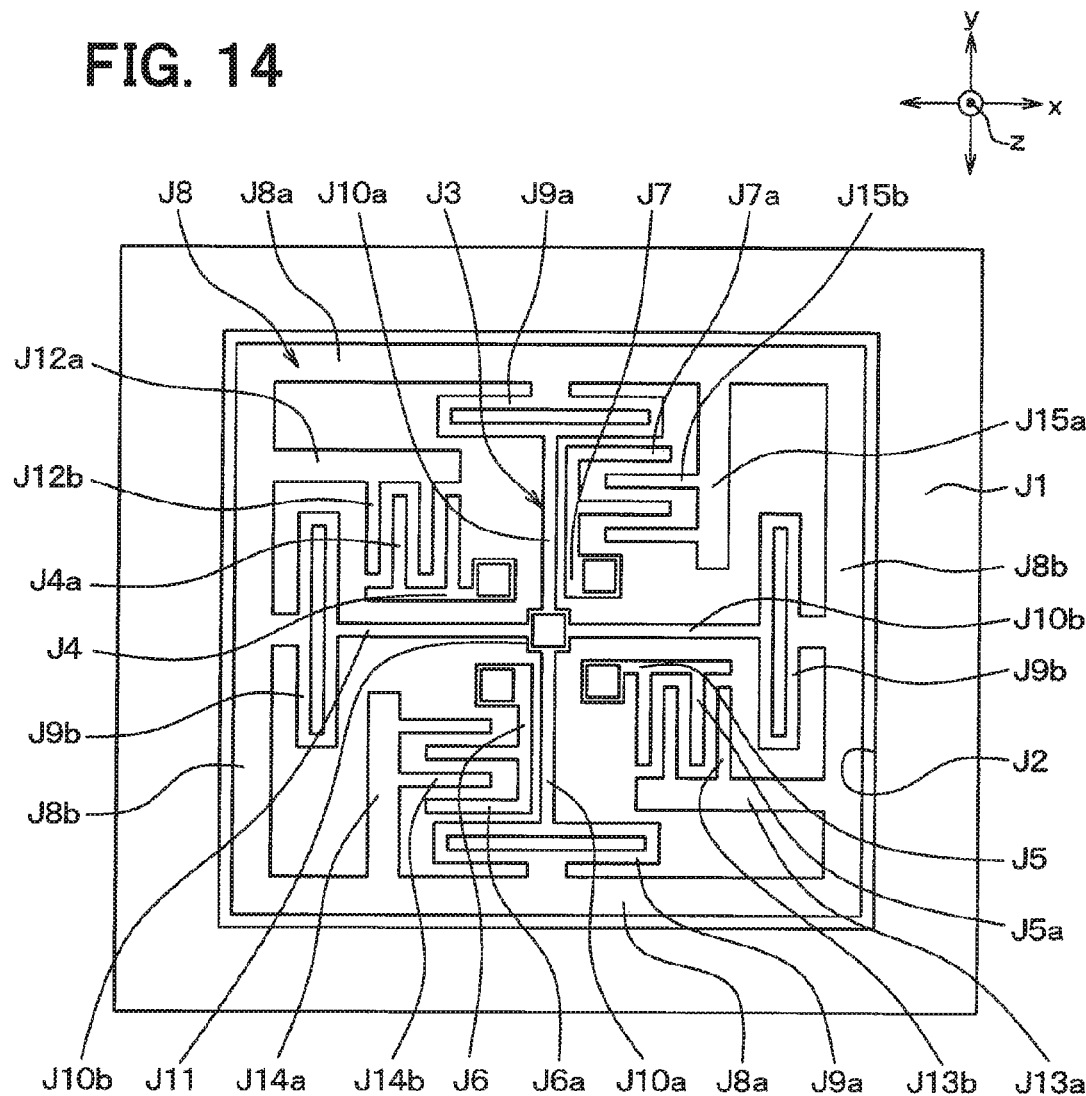
FIG. 14 is a top view of the acceleration sensor illustrating a problem.
Figure 15:
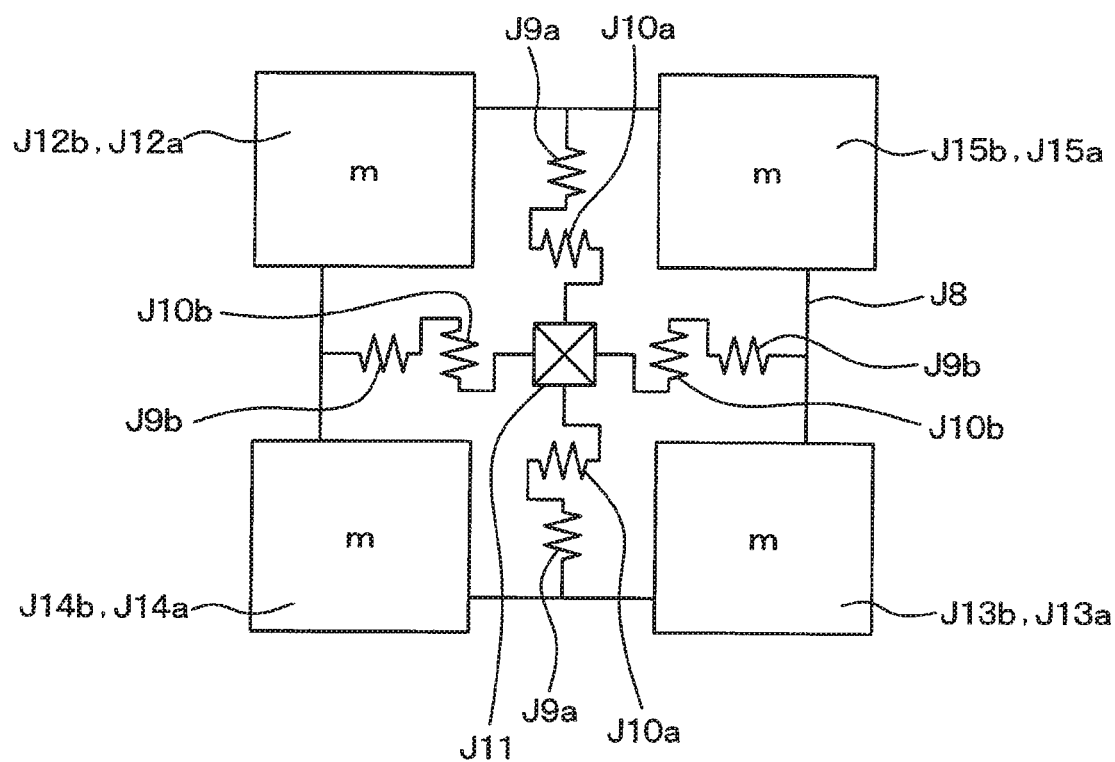
FIG. 15 is a diagram illustrating an equivalent model of a movable portion illustrated in FIG. 14.

As illustrated in FIG. 13, in the present embodiment, pads 81 to 85 are formed on a semiconductor layer 13.

In a substrate 91, concave portions 91d are defined in portions facing the pads 81 to 85. An insulating film 92 is also formed on a wall surface of each concave portion 91d in addition to one surface 91a. A wiring part 95 is formed on the insulating film 92, and metal-joined to each of the pads 81 to 85, and also formed on a bottom surface of the concave portion 91d.

A through-hole electrode portion 94 has a through-hole 94a formed to expose the wiring part 95 from the bottom surface of the concave portion 91d, and the through-hole electrode 94c is electrically connected to the wiring part 95.

A peripheral portion 70 of a semiconductor layer 13 is joined to an insulating film 92 facing the peripheral portion 70 through a joint member 96 made of an oxide film or a low dielectric glass.

As described above, the same advantages as those in the sixth embodiment can be obtained even if the through-hole electrode portion 94 is electrically connected to the pads 81 to 85 through the wiring part 95.

Other Embodiments

The present disclosure is not limited to this embodiments described above and modifications can be suitably performed within a scope of the appended claims.

For example, in the above respective embodiments, the anchor portions 28 are formed inside of the frame portion 22, but the anchor portions 28 may be formed outside of the frame portion 22. In other words, the second beam portions 23b may be disposed outside of the second side portions 22b.

In the respective embodiments, the first and second beam portions 23a and 23b may have a polygonal-shaped spring function.

In the respective embodiments, the shape of the frame portion 22 is not limited to a rectangular frame, but, for example, may be an annular shape.

Furthermore, in the respective embodiments, the frame portion 22 may not coincide with the center of the support substrate 11. Even if such an acceleration sensor is configured, because the rotational moment can be reduced (rotation resonance is larger), the frame portion 22 can be restrained from rotating.

In the above first and fourth to seventh embodiments, the acceleration sensor may have only the first and third movable electrode portions 24, 26, and the first and third fixing portions 30, 50. In other words, the acceleration in the x-axis direction may be detected on the basis of the first capacitance $C_{s1}$, and the acceleration in the y-axis direction may be detected on the basis of the third capacitance $C_{s3}$.

Further, in the above respective embodiments, potentials to be applied to the pads 82 to 85 may be controlled independently. In other words, a predetermined potential may be applied to only the pads 81 to 83 when detecting the acceleration in the x-axis direction, and a predetermined potential may be applied to only the pads 81, 84, and 85 when detecting the acceleration in the y-axis direction.

The above respective embodiments can be appropriately combined together. For example, the second embodiment may be combined with the fourth to seventh embodiments so that the first to fourth movable electrode portions 24 to 27 and the first to fourth fixing portions 30 to 60 are formed linearly symmetrically with respect to the first virtual line K1. The third embodiment may be combined with the fourth to seventh embodiments so that the first to fourth movable electrode portions 24 to 27 and the first to fourth fixing portions 30 to 60 are formed linearly symmetrically with respect to the second virtual line K2. Furthermore, the fourth embodiment may be combined with the fifth to seventh embodiments so that the first to fourth movable electrode portions 24 to 27 are formed in the vicinity of the center of the frame portion 22. The above fifth embodiment may be combined with the sixth and seventh embodiments so that the concave portion 17 may be defined in the support substrate 11.

The invention claimed is:

1. An acceleration sensor comprising:
   a semiconductor substrate that has a support substrate and a semiconductor layer stacked on the support substrate;
   a first-direction movable electrode that is disposed in the semiconductor layer, and extends in a direction parallel to a second direction, wherein a direction included in a plane of the semiconductor layer is referred to as a first direction, and the second direction is included in the plane of the semiconductor layer and is orthogonal to the first direction;
   a second-direction movable electrode that is disposed in the semiconductor layer, and extends in a direction parallel to the first direction;
   a frame portion that is disposed in the semiconductor layer;
   a first beam portion that is disposed in the semiconductor layer and provided on the frame portion, and is displaced in the second direction when receiving an acceleration including a component in the second direction;
   a second beam portion that is disposed in the semiconductor layer and provided on the frame portion, and is displaced in the first direction when receiving an acceleration including a component in the first direction;
   an anchor portion that supports the frame portion through the second beam portion;
   a first-direction fixed electrode that is disposed in the semiconductor layer, and arranged to face the first-direction movable electrode; and
   a second-direction fixed electrode that is disposed in the semiconductor layer, and arranged to face the second-direction movable electrode, wherein
   the semiconductor layer is provided with a rod-shaped weight portion that passes through a center of the frame portion, extends in the second direction, and is connected to the frame portion through the first beam portion, and
   the first-direction movable electrode and the second-direction movable electrode are provided on the weight portion.

2. The acceleration sensor according to claim 1, wherein the first beam portion is disposed between an end of the weight portion and the frame portion, and the second beam portion is linearly symmetrically disposed with respect to the weight portion.

3. The acceleration sensor according to claim 1, wherein the anchor portion is located inside of the frame portion.

4. The acceleration sensor according to claim 1, wherein a center of the frame portion coincides with a center of the support substrate, the first-direction movable electrode includes a first movable electrode portion and a second movable electrode portion that are disposed symmetrically with respect to the center of the frame portion, and the first-direction fixed electrode includes a first fixed electrode portion and a second fixed electrode portion that are disposed point symmetrically with respect to the center of the frame portion, the second-direction movable electrode includes a third movable electrode portion and a fourth movable electrode portion that are disposed point symmetrically with respect to the center of the frame portion, and the second-direction fixed electrode includes a third fixed electrode portion and a fourth fixed electrode portion that are disposed point symmetrically with respect to the center of the frame portion, an acceleration in the first direction is detected according to a difference between a first capacitance generated between the first movable electrode portion and the first fixed electrode portion and a second capacitance generated between the second movable electrode portion and the second fixed electrode portion, and an acceleration in the second direction is detected according to a difference between a third capacitance generated between the third movable electrode portion and the third fixed electrode portion and a fourth capacitance generated between the fourth movable electrode portion and the fourth fixed electrode portion.

5. The acceleration sensor according to claim 1, wherein a center of the frame portion coincides with a center of the support substrate, the first-direction movable electrode includes a first movable electrode portion and a second movable electrode portion that pass through the center of the frame portion, and are disposed linearly symmetrically with respect to a first virtual line parallel to the first direction, the first-direction fixed electrode includes a first fixed electrode portion and a second fixed electrode portion that are disposed on opposite sides of the first virtual line, the second-direction movable electrode includes a third movable electrode portion and a fourth movable electrode portion that are disposed linearly symmetrically with respect to the first virtual line, and the second-direction fixed electrode includes a third fixed electrode portion and a fourth fixed electrode portion that are disposed linearly symmetrically with respect to the first virtual line, and an acceleration in the first direction is detected according to a difference between a first capacitance generated between the first movable electrode portion and the first fixed electrode portion and a second capacitance generated between the second movable electrode portion and the second fixed electrode portion, and an acceleration in the second direction is detected according to a difference between a third capacitance generated between the third movable electrode portion and the third fixed electrode portion and a fourth capacitance generated between the fourth movable electrode portion and the fourth fixed electrode portion.

6. The acceleration sensor according to claim 1, wherein a center of the frame portion coincides with a center of the support substrate, the first-direction movable electrode includes a first movable electrode portion and a second movable electrode portion that that pass through the center of the frame portion and are disposed linearly symmetrically with respect to a second virtual line parallel to the second direction, and the first-direction fixed electrode includes a first fixed electrode portion and a second fixed electrode portion that pass through the center of the frame portion, and are disposed linearly symmetrically with respect to the second virtual line, the second-direction movable electrode includes a third movable electrode portion and a fourth movable electrode portion that are disposed linearly symmetrically with respect to the second virtual line, the second-direction fixed electrode includes a third fixed electrode portion and a fourth fixed electrode portion that are disposed on opposite sides of the second virtual line, and an acceleration in the first direction is detected according to a difference between a first capacitance generated between the first movable electrode portion and the first fixed electrode portion and a second capacitance generated between the second movable electrode portion and the second fixed electrode portion, and an acceleration in the second direction is detected according to a difference between a third capacitance generated between the third movable electrode portion and the third fixed electrode portion and a fourth capacitance generated between the fourth movable electrode portion and the fourth fixed electrode portion.

7. The acceleration sensor according to claim 1, wherein the weight portion includes a first-direction support portion that is parallel to a first virtual line that passes through a center of the frame portion, and is parallel to the first direction, and the first-direction movable electrode is provided on the weight portion so that the first-direction movable electrode is provided on the first-direction support portion and projects from the first-direction support portion in a direction opposite to the first virtual line.

8. The acceleration sensor according to claim 1, wherein the first and second beam portions each have a rectangular frame shape in which two parallel beams are connected on both ends of the beams.

* * * * *